UNITED STATES PATENT OFFICE.

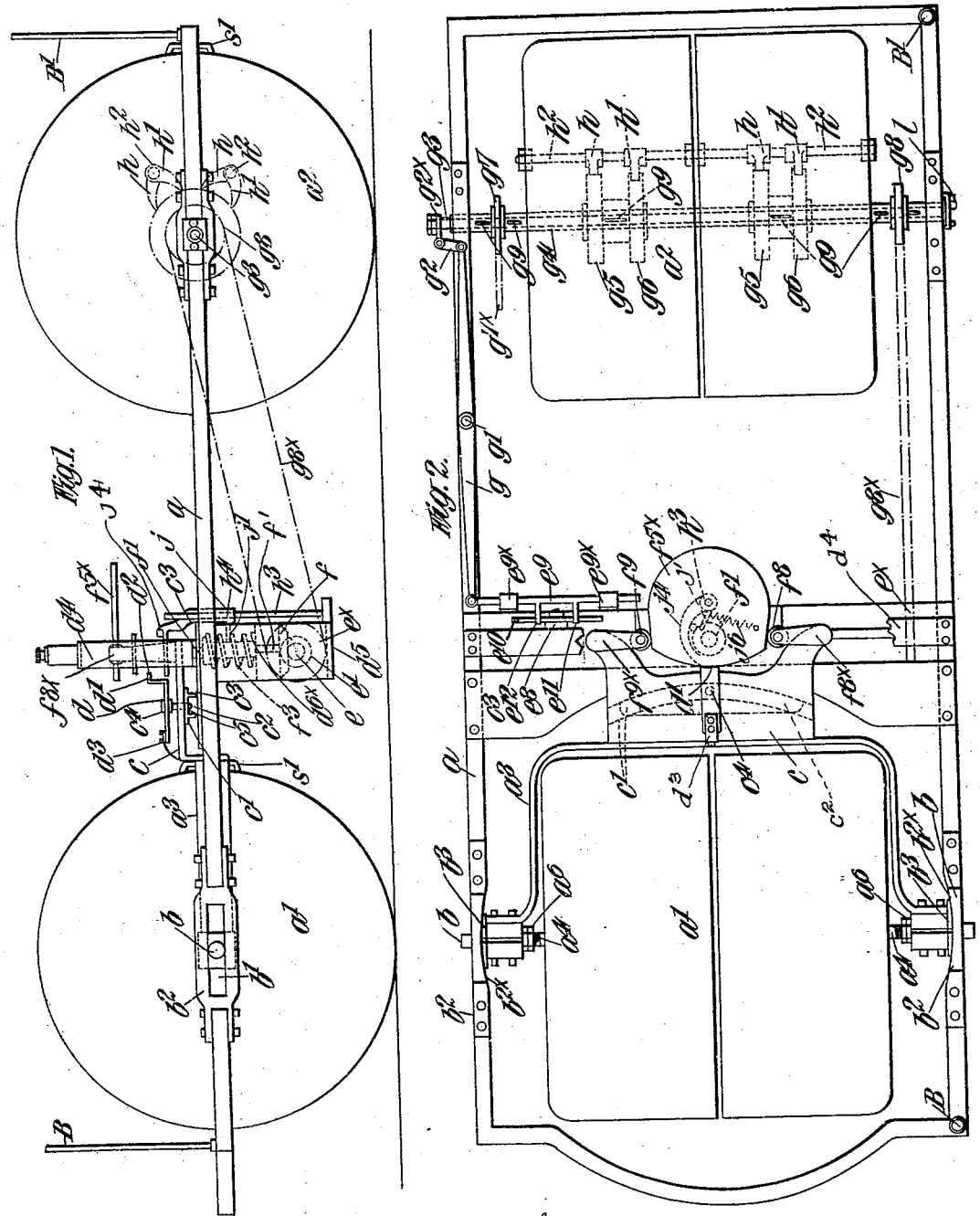

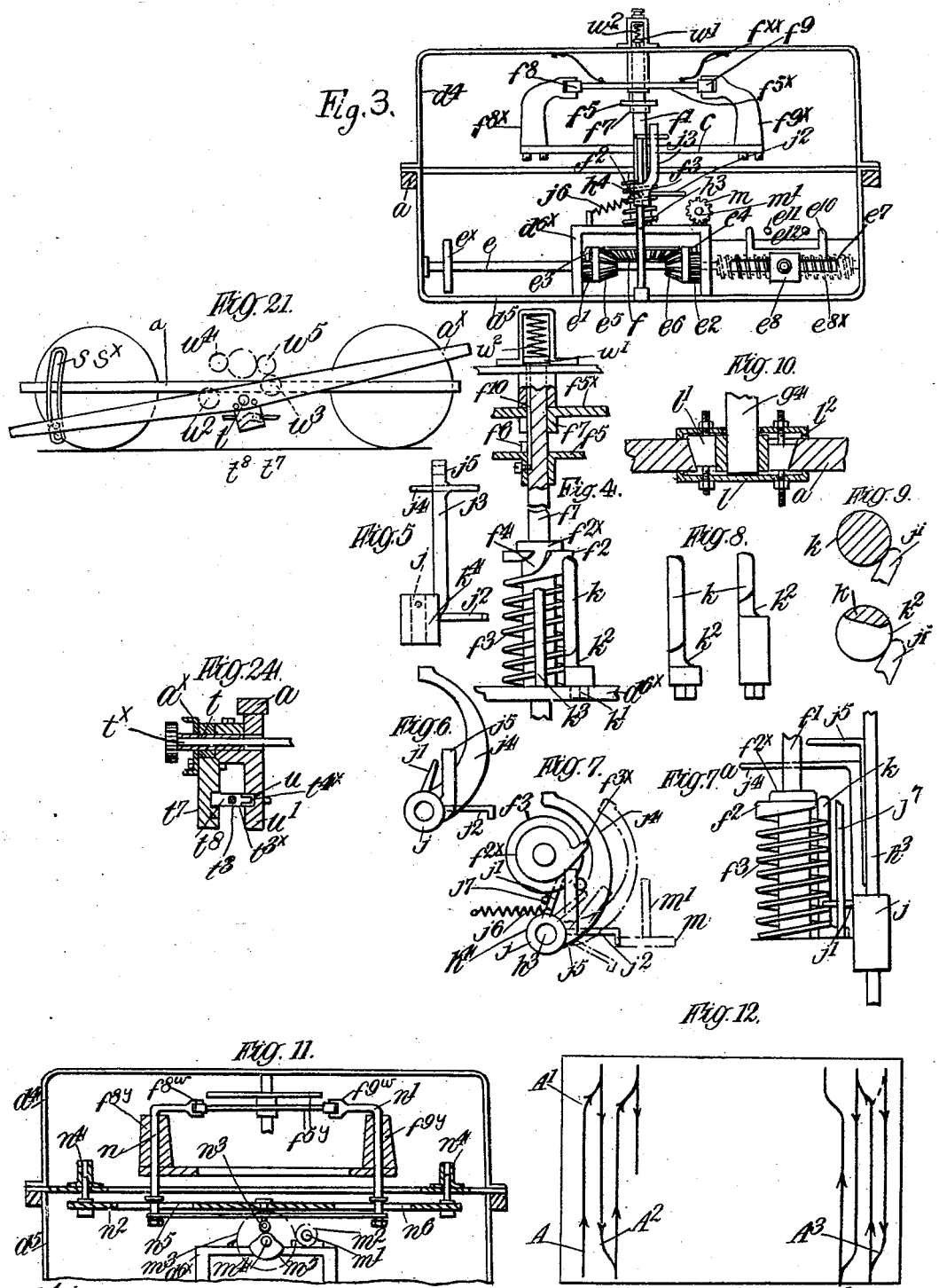

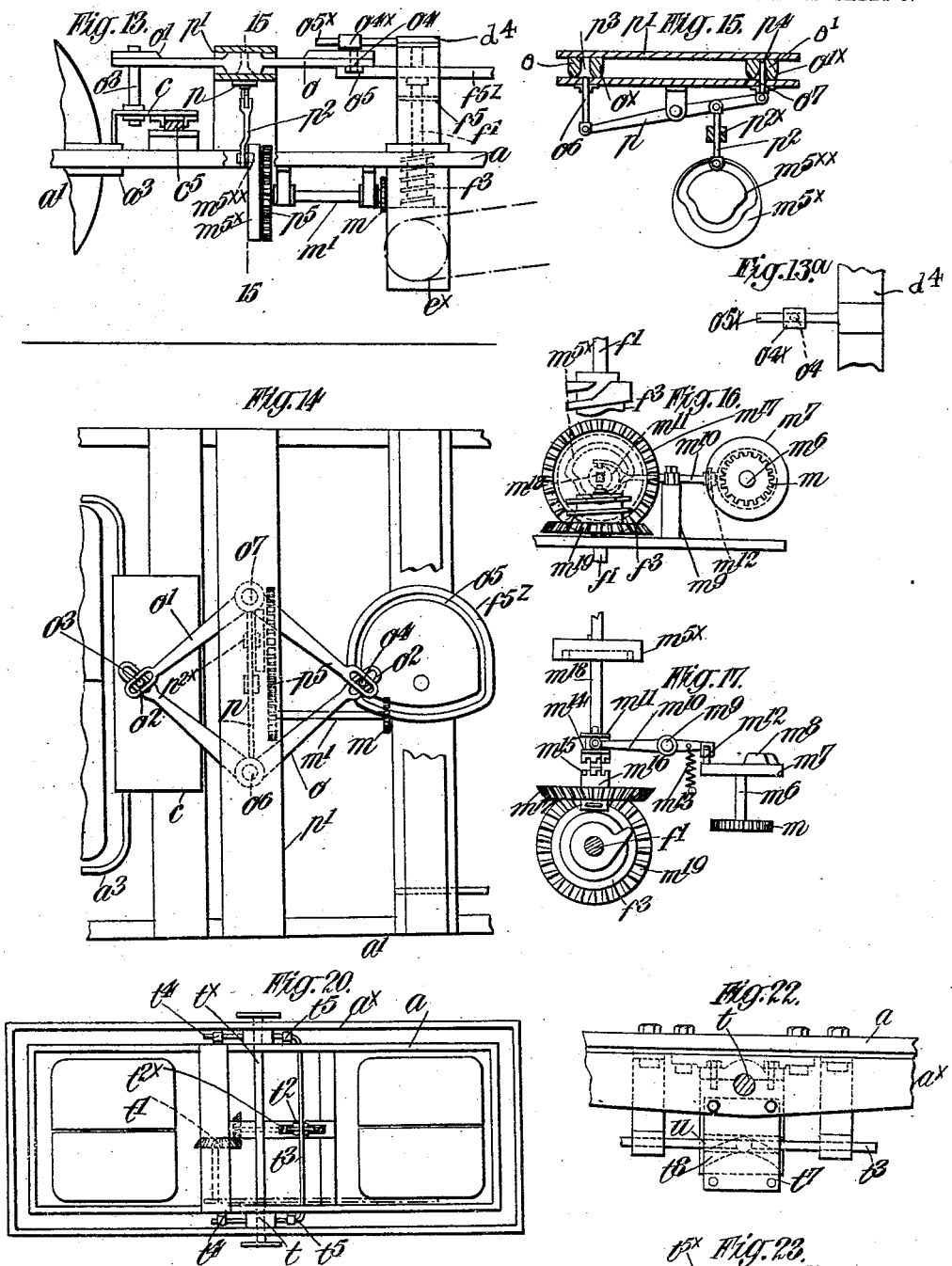

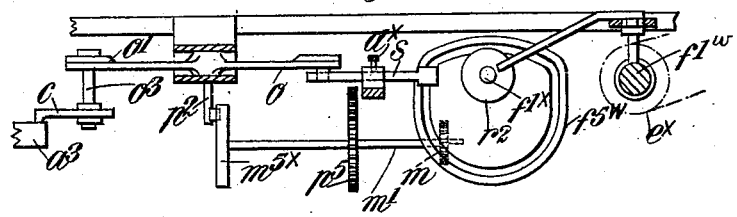

GEORGE HERBERT COLT, OF WEST HAMPSTEAD, ENGLAND.

AGRICULTURAL MACHINE FOR ROLLING, MOWING, AND OTHER SIMILAR OPERATIONS.

941,309.  Specification of Letters Patent.  Patented Nov. 23, 1909.

Application filed January 28, 1909. Serial No. 474,787.

*To all whom it may concern:*

Be it known that I, GEORGE HERBERT COLT, M. B., F. R. C. S. Eng., a subject of the King of Great Britain, residing at 4 Priory Court, Mazewood avenue, West Hampstead, in the county of Middlesex, England, have invented certain new and useful Improvements in or Relating to Agricultural Operations, such as Rolling, Mowing, and other Similar Operations, of which the following is a specification.

This invention relates to rolling, mowing and other similar agricultural operations and has for its chief object to enable such operations as rolling, mowing, and the like to be effected in a more simple and effective manner than heretofore.

According to this invention the aforesaid agricultural operations are effected automatically by an apparatus capable of treating portions or plots of land of any area in a continuous manner in one or more directions. Assuming, for example, a lawn is to be treated, the apparatus would automatically traverse the length of the same, and when nearing the edge in its forward movement would be deviated laterally and its motion reversed to enable it to traverse the adjoining strip of lawn in the opposite direction, these deviations and reversals occurring each time the apparatus reaches the end of its longitudinal travel and in this way enabling the whole surface of the lawn to be treated in an effective manner. Moreover the apparatus can be arranged to automatically reverse the direction of movement when the whole surface of the lawn has been traversed in one direction, so as to cause the apparatus to re-traverse the ground on its return in the opposite direction. In this way it will be seen that a lawn or plot of land of any area may be treated automatically by merely setting and adjusting the apparatus before starting.

In order that the said invention may be clearly understood and readily carried into effect I will proceed to describe the same more fully with reference to the examples illustrated in the accompanying drawings in which:—

Figure 1 is a diagrammatic view in elevation of the improved apparatus as used for rolling operations and Fig. 2 a corresponding plan thereof. Fig. 3 is a view of the mechanism for effecting the steering, the rear rollers being removed to show the parts more clearly. Figs. 4 to 10 are detail views thereof drawn to an enlarged scale. Fig. 11 is a view showing the mechanism for effecting the change in lateral deviation when the apparatus is required to re-traverse the ground. Fig. 12 is a diagram illustrating the path of the apparatus when treating a lawn or other plot of land. Fig. 13 is an elevation of a modified form of mechanism for effecting the lateral deviation and retaining the fore-carriage of the apparatus in alinement with the body when traversing a straight path and Fig. 13$^a$ a detail thereof. Fig. 14 is a plan of the mechanism, and Fig. 15 a section on the line 15—15 of Fig. 13. Figs. 16 and 17 are an elevation and plan respectively of a modified form of gear for actuating the mechanism for effecting the reversal of the lateral deviation. Fig. 18 is an elevation of a modified form of the apparatus and Fig. 19 a plan thereof. Fig. 20 is a view illustrating the mode of providing for the machine carrying various implements, or devices for use in agricultural operations in general. Fig. 20$^a$ is a detailed view showing the worm $t^{2x}$ engaging the forked slide. Fig. 21 is an elevation thereof. Figs. 22 to 25 inclusive are detail views of this attachment.

Referring to Figs. 1 to 3 $a$ is the frame of the apparatus mounted upon the bipart rollers $a'$, $a^2$ which are adapted to turn freely on their respective shafts except when otherwise arranged. The former of these rollers $a'$ is provided with a suitable fore-carriage $a^3$ and is mounted in the frame $a$ so as to be capable of guiding the apparatus in its movements. The extremities $b$ of the shaft $a^4$ which carries the bipart roller $a'$ are adapted to move in slots $b'$ formed in the members $b^2$ of the frame and may be provided with suitable roller bearings. This shaft is also provided with divided collars $b^3$ to which is attached the fore-carriage $a^3$, the arrangement being such that the fore-carriage can be readily detached from the shaft $a^4$ when desired. The portions of the shaft $a^4$ which carry the divided collars $b^3$ are preferably formed of square section so as to enable the fore-carriage $a^3$ to be securely mounted upon said shaft. Two lock nuts $a^6$ (Fig. 2) are also provided upon the shaft $a^4$ so as to allow for adjustment for wear. On the fore-carriage $a^3$ is mounted an angular member $c$ secured thereto in any suitable manner. The underside of this angular member is provided with two curved members $c'$ together forming a guide in which the correspondingly curved projection $c^2$ carried by the cross member $c^3$ of the frame is located. The projection $c^2$ is made a working fit between the two curved guide members $c'$ of the fore-carriage and serves in conjunction with the bearing afforded to the collars $b^3$ by the curved surfaces $b^{2x}$ of the frame $b^2$ to control the guiding movements of the bipart roller $a'$. The angular member $c$ of the fore-carriage is provided with a hole $c^4$ located midway between the two curved guide members $c'$ and when the fore-carriage is in position for guiding the apparatus in a straight path, this hole $c^4$ registers with a corresponding hole $c^5$ formed in the curved projection $c^2$ of the cross member $c^3$ of the frame. Into these holes a pin $d$ is adapted to enter so as to prevent the fore-carriage from moving and the apparatus from deviating from its straight course. The pin $d$ carries a part $d'$ bent up at one end to form a tappet $d^2$ and at the other end is subjected to the action of the spring $d^3$ which tends to depress the pin to engage with the holes $c^4$, $c^5$. Between the rollers $a'$ and $a^2$ two members $d^4$ $d^5$ (Fig. 3) are arranged to support the mechanism effecting the guiding movements of the fore-carriage and these members are secured to the frame $a$. The member $d^5$ is provided with an intermediate support $d^{6x}$ which together with the member $d^5$ has bearings for the shaft $e$. This shaft $e$ is driven from the shaft $g^4$ by means of the sprocket wheels $g^8$ and $e^x$ connected by a continuous chain $g^{8x}$. The said shaft $e$ carries ratchet wheels $e'$, $e^2$ which are secured thereto in any suitable manner and which actuate respectively through the pawls $e^3$ $e^4$ the adjacent bevel pinions $e^5$, $e^6$ which are loosely mounted on the shaft $e$. The pawls $e^3$, $e^4$ are arranged with respect to the ratchet wheels $e'$, $e^2$, so that only one of them will be in engagement with its ratchet wheel when the shaft $e$ is rotated in any particular direction; on reversing the direction of rotation the pawl previously in engagement will be released and the other one engaged with its ratchet wheel. The shaft $e$ also carries a worm $e^7$ (Fig. 3) with which a nut $e^8$ engages so as to have a lateral motion imparted thereto to reverse the direction of movement of the apparatus when predetermined distances have been traversed, said nut being guided in its movements by a projection thereon engaging with the guide $e^{8x}$.

The nut $e^8$ is provided with a forked piece $(e^{10})$ which is adapted by suitable means, such as a counterweight arranged in a position of unstable equilibrium to bring about the reversal of the prime mover. The nut $e^8$ is also adapted to actuate a rod $e^9$ (Fig. 2) by the forked piece $e^{10}$ thereof engaging with one or other of the projections $e^{11}$, $e^{12}$ of the rod $e^9$ according to the direction of movement of the nut $e^8$ along the worm $e^7$; said rod $e^9$ being slidably mounted in lugs $e^{9x}$ to allow of such lateral movement. To the outer extremity of the sliding rod $e^9$ is connected one end of the lever $g$ pivoted at $g'$ to the frame of the apparatus. The other extremity is connected by a link $g^2$ to the spindle $g^3$ passing through the hollow shaft $g^4$ of the rear bipart roller $a^2$, the said spindle being capable of rotating in a collar $g^{2x}$ formed on the said link $g^2$. The shaft $g^4$ carries loosely mounted thereon the two sets of ratchet wheels $g^5$, $g^6$, and the sprocket wheels $g^7$, $g^8$; these wheels can be secured to the shaft $g^4$ by means of the snugs $g^9$ which are brought into engagement with corresponding recesses or openings formed in the bosses of said wheels, the said engagement being effected by actuating the sliding spindle $g^3$ in the desired direction. Two pairs of pawls $h$, $h'$ engage with the ratchet wheels $g^5$, $g^6$ said pawls being carried by the rods $h^2$ secured to the respective parts of the roller $a^2$. These pawls are arranged in a similar manner to the above mentioned pawls $e^3$, $e^4$ carried by the bevel pinions $e^5$, $e^6$, each pawl of the respective pair being adapted for engagement with its corresponding ratchet wheel for a particular direction of rotation of the hollow shaft $g^4$. It will be seen that one or other of the ratchet wheels $g^5$ $g^6$ of each set is secured according to the direction of movement of the spindle $g^3$. This results in an automatic differential motion being established between the two members of the bipart roller $a^2$ irrespective of the direction of longitudinal traverse of the apparatus. The sprocket wheels $g^7$, $g^8$ are however connected to the shaft $g^4$ irrespective of the direction of movement of the spindle.

Arranged above and engaging with the bevel pinions $e^5$, $e^6$ is a bevel wheel $f$ carried by the vertically disposed shaft $f'$ and owing to the disposition of the bevel pinions $e^5$ $e^6$ and the ratchet wheels $e'$ $e^2$ the direction of rotation of this shaft will be independent of the direction of rotation of the power shaft $e$, said shaft $f'$ being driven in the same direction for both directions of rotation of the shaft $e$. The shaft $f'$ has secured thereto a sleeve $f^2$ (Fig. 4) on which is formed a worm $f^3$ having at its upper end a portion $f^4$ of an inclination much greater than the convolutions of the worm so that in a small movement of the worm this portion $f^4$ rises to a suitable distance say for example a distance approximately equal to the pitch of the worm.

Above the worm $f^3$ is mounted a member $f^5$ (Fig. 4) splined to the shaft $f'$ in such a manner as to be capable of vertical movement. The key $f^6$ carried by this sliding member moves with it and is arranged to engage with the boss $f^7$ of the edge cam $f^{5x}$ when the member $f^5$ and key $f^6$ are in their highest position. This edge cam is loosely mounted on the shaft $f'$ and is only rotated therewith when engaged with the splined member $f^5$. The springs $f^{xx}$, Fig. 3, aid in maintaining the said cam in its zero position.

The key $f^6$ of the member $f^5$ is arranged in a groove $f^{10}$ in the shaft $f'$ and extends beyond the upper surface of the cross member $d^4$ into engagement with a collar $w'$. On this collar the spring $w^2$ rests so that the member $f^5$ is raised into engagement with the cam $f^{5x}$ against the action of the spring which thus tends to return it after being raised. The mode of effecting the engagement of these two parts may be varied and any convenient form of claw coupling or clutch may be employed. Bearing on the edge of the cam $f^{5x}$ are two rollers $f^8$, $f^9$ carried respectively by arms $f^{8x}$, $f^{9x}$, projecting vertically above the angular member $c$ of the fore-carriage $a^3$ of the apparatus. Parallel with the axis of the shaft $f'$ is a guide rod $h^3$ upon which is mounted the slider $h^4$ (Fig. 3) an arm $j'$ of which is adapted to engage with and traverse the length of the worm $f^3$. This slider comprises a boss $j$ (Figs. 5 and 6) having projections $j'$ $j^2$ and a vertically disposed arm $j^3$ carrying toward its upper end the projections $j^4$ $j^5$, the former of which is curved in a suitable manner. The projection $j^5$ is shown arranged laterally in regard to the boss $j$ but if desired it may be arranged centrally in relation thereto. A spring $j^6$ tends to keep the arm $j'$ on the slider normally in engagement with the worm, the movement of said arm being restricted by the vertical stop bar $j^7$, Figs. 7 and 7$^a$. Adjacent to the worm $f^3$ is located a cam bar $k$ which is secured in position by a projection $k'$ thereon engaging with a corresponding recess or opening formed in the upper surface of the intermediate support $d^{6x}$ the lower part of this bar being cut away to form the recess $k^2$. The cam bar can be readily removed and replaced by any other bar to accord with requirements as will be hereinafter explained. The upper end of the sleeve $f^2$ carries a cam $f^{2x}$ having a projection $f^{3x}$ the action of which will be explained later.

The power for driving the apparatus may be obtained from an electric motor or other suitable source of power (not shown) arranged on any convenient part of the structure. Power is transmitted from the motor to the sprocket wheel $g^7$ to actuate the shaft $g^4$ and bipart roller $a^2$, and from the sprocket wheel $g^8$ to the sprocket wheel $e^x$ secured to the intermediate shaft $e$. In order to adjust the tension of the chain or belt, as the case may be, which transmits power from the shaft $g^4$ to the intermediate shaft $e$ through the sprocket wheels $g^8$ and $e^x$, said shaft $g^4$ may be mounted in bearings $l$ (Fig. 10) capable of being moved in either direction by acting upon the respective wedge-pieces $l'$ $l^2$. The tension of the chain or belt transmitting power from the generator to the shaft $g^4$ is adjusted by altering the position of the generator relatively to the framework $a$. A wheel $m$ is arranged in the path of the slider $h^4$ and has a rotary motion imparted thereto at each passage of the slider; this wheel is intended for use with mechanism which serves to change the direction of lateral deviation of the apparatus when it has traversed the surface of the lawn or plot of land under treatment and so cause the same to re-traverse the ground. This latter mechanism may however be dispensed with and the action of the apparatus without this mechanism will now be explained.

Assuming that it is desired to roll a lawn as shown in Fig. 12, the apparatus is started at A and follows a straight path to the point A' where it deviates to traverse the adjoining strip of land in the opposite direction. The apparatus will assume a straight path to the point A$^2$ where it will again deviate to traverse the next adjoining strip in the opposite direction. These deviations and reversals will occur each time the apparatus nears the edges of the lawn or plot and cause the same to traverse the path as shown by the arrows in the figure under description. When the apparatus is started at A (Fig. 12) both rollers will be in alinement and power will be transmitted from the motor to the shaft $g^4$ through the sprocket wheel $g^7$ and chain $g^{7x}$ and from thence to the bipart roller $a^2$ through the pawls $h'$ and ratchet wheels $g^6$. Motion will also be imparted to the shaft $e$ through the sprocket wheels $g^8$, $e^x$ and chain $g^{8x}$. The rotation of the shaft $e$ will cause the nut $e^8$ to traverse the worm $e^7$ and will also impart motion to the bevel wheel $f$ through the ratchet wheel $e'$ engaging with the pawl $e^3$ on the bevel pinion $e^5$. The shaft $f'$ will rotate with the bevel wheel $f$ and the arm or projection $j'$ of the slider $h^4$ engaging with the worm $f^3$ will cause the said slider to move vertically along the worm. This vertical movement of the slider will be uniform until the arm $j'$ reaches the surface $f^4$ of the worm when the said slider will have a sudden vertical movement imparted thereto. This sudden vertical movement will be imparted to the splined member $f^5$ owing to the arm $j'$ on the slider engaging with the surface $f^4$ and the arm $j^5$ imparting its upward movement to the member $f^5$ will lock the same to the edge cam $f^{5x}$. The locking is effected by the key $f^6$ engaging with a corresponding opening in the boss $f^7$ of the cam $f^{5x}$. These two members will engage with each other until the arm $j'$, riding on the upper surface of the sleeve $f^2$, strikes against the projection $f^{3x}$ on the cam $f^{2x}$, when the slider will be turned out from the worm $f^3$ to assume the dotted position shown in Fig. 7. In order to facilitate the working of the arm $j'$ in relation to the projection $f^{3x}$ on the cam $f^{2x}$ the arm may be given a curved or bent formation. The arm $j'$ being thus taken out of engagement with the worm $f^3$ and the arm $j^5$ with the member $f^5$ the latter will assume its lower position under the action of the spring $w^2$ and the slider $h^4$ will fall under the influence of the gravity and the spring $j^6$, the arm $j'$ being retained out of engagement with the worm owing to its location on the side of the cam bar $k$ remote therefrom (Fig. 9). When the arm $j'$ reaches the opening $k^2$ formed in the cam bar $k$ it will enter into engagement with the worm $f^3$ under the influence of the spring $j^6$, and thereby again impart a vertical movement to the slider. By changing the cam bar $k$ the travel of the slider may be varied; two cam bars for different lengths of travel of the slider are shown in Fig. 8. The engagement of the member $f^5$ with the cam $f^{5x}$ will cause the latter to be rotated and thereby impart motion to the fore carriage $a^3$ through the arms $f^{8x} f^{9x}$ to deviate the bipart roller $a'$ from its course.

When the apparatus is following a straight course the movement of the fore carriage relatively to the frame of the apparatus is prevented by the pin $d$ engaging with the holes or openings $c^4$ and $c^5$ formed respectively in the angular member $c$ of the fore carriage and the curved projection $c^2$ of the cross member $c^3$ of the frame, but when the member $f^5$ is brought into engagement with the cam $f^{5x}$, the curved arm $j^4$ of the slider engages with the tappet $d'$ of the pin $d$ thereby disengaging the latter from the openings $c^4$ and $c^5$ and unlocking the fore carriage. The rotation of the cam $f^{5x}$ imparts motion to the arms $f^{8x}$ and $f^{9x}$ and through them to the fore carriage thereby causing the apparatus to deviate from its straight path as shown at A'. When the cam has completed a revolution it will be seen that the rollers are again brought into alinement and on reversal of the power a straight course will be followed until the point $A^2$ is reached. To enable this return motion to be effected it is necessary to reverse the direction of rotation imparted to the apparatus by the motor and to disengage the ratchet wheels $g^6$ from the shaft $g^4$ and secure the other ratchet wheels $g^5$ to the said shaft. These two operations are effected by means of the nut $e^8$ which in its lateral movement is adapted to control the necessary switches or gear for reversing the power, and also to impart motion to the spindle $g^3$ through the lever $g$ and link $g^2$ to engage one or other of the ratchet wheels $g^5$ or $g^6$ with the hollow driving shaft $g^4$, according to the direction of movement of the apparatus.

The apparatus may readily be set to operate upon a lawn of any length by having a suitable worm $f^3$ and cam bar K fitted thereto. It is not always necessary to change both worm and cam bar for different lengths of ground as the worms may be adapted for use in connection with all lengths of ground within certain limits. For example if the worm is designed for a length of 100 ft. it can be used for any lawn or plot of land not exceeding this length. If it is desired to treat a lawn 50 feet in length, only half the worm is brought into action, this result being obtained by employing a cam bar K having the opening $K^2$ formed at the mid position of the worm $f^3$. When the apparatus reaches the point $A^2$ (Fig. 12) the fore-carriage $a^3$ will again be acted upon by the cam $f^{5x}$ to cause the apparatus to deviate from its straight course and return in the opposite direction along the adjoining strip of land. These deviations and reversals will take place whenever the apparatus reaches the bounds of the land under treatment and in this manner enable the same to be treated automatically in an improved manner. When the above mentioned apparatus has traversed the breadth of the land it has to be stopped as no provision is made for automatically reversing the lateral deviation when this point is reached and this is effected either by hand or by an adaptation of the gear to be next described, whereby the cam $m^5$ thereof is caused to switch off the generator. To obtain this automatic reversal of the lateral deviation a toothed wheel $m$ (Fig. 3) is provided; this wheel is adapted to be rotated through a distance equal to one tooth at each upward movement of the slider $h^4$, the arm $j^2$ on the latter engaging with and rotating the same. On the downward movement of the slider $h^4$ the arm $j^2$ is clear of the wheel $m$ and consequently does not affect the same. The toothed wheel $m$ is securely mounted upon the shaft $m'$ coupled by suitable gear wheels $m^2$, $m^3$ with the shaft $m^4$ carrying the cam $m^5$. This train of gear wheels is also provided with a suitable ratchet and pawl so that motion can only be imparted thereto in one direction.

Instead of using one cam $f^{5x}$ two cams $f^{5y}$ are used in this arrangement both cams being carried on one boss and moving together, the lower of the two cams acting to deviate the fore-carriage in a similar manner to the single cam of the previous arrangement and the upper cam acting in a precisely opposite manner. The arms $f^{8y}$ and $f^{9y}$ (Fig. 11) of the fore-carriage are made hollow to allow for the passage of the rods $n$ and $n'$ carrying respectively the rollers $f^{8w}$ and $f^{9w}$ adapted to engage with the cams $f^{5y}$. These rods $n$ and $n'$ are carried by a member $n^2$ actuated in a vertical direction by a roller $n^3$ engaging with the cam $m^5$, the said member being guided in its movement by the guides $n^4$. Slots $n^5$ $n^6$ in the member $n^2$ allow of the deviation of the fore-carriage without disturbing the arrangement of the guides $n^4$. The other parts of the apparatus remain the same and operate in the manner already described.

When the apparatus reaches the point $A^3$ on the lawn (Fig. 12) the cam $m^5$ will have been rotated from the position shown in Fig. 11 to bring the rollers $f^{8w}$, $f^{9w}$ into engagement with the upper cam $f^{5y}$ which is oppositely arranged to the lower cam, and which serves to deviate the fore-carriage in the opposite direction. This movement of the fore-carriage guides the apparatus on to the adjoining strip of land previously traversed, the cam $f^{5y}$ being disengaged from the sliding member $f^5$ when the fore-carriage has brought the roller $a'$ again into alinement with the roller $a^2$. The cam $m^5$ may be varied in size and in shape according to requirements, and may be arranged so as to bring into operation a supplementary gear train to control the upward or downward motion of the member $n^2$. The supplemental train may be driven from the shaft $f'$ by suitable bevel or other gearing as will be hereinafter described. The reversing of the power and the action of the sliding spindle $g^3$ are controlled by the nut $e^8$ as already described. When the apparatus arrives at A it will again traverse the path A, A', $A^2$ as previously described.

Referring to Figs. 13 to 15 in which is shown a modified arrangement for obtaining the deviation of the apparatus in both directions, only one cam $f^{5z}$ is employed this being a face cam instead of the edge cams previously described. The toothed wheel $m$ is adapted to be rotated by the arm $j^2$ of the slider $h^4$ in a similar manner to the corresponding wheel in the previous arrangement. The deviation of the fore-carriage is obtained by the action of the face cam $f^{5z}$ on one or other of the bell crank levers $o$ $o'$. These bell crank levers are provided with slots $o^2$ at their ends which are superimposed and arranged at right angles to each other, pins $o^3$ and $o^4$ being arranged so as to be free to move along the said slots. The pin $o^3$ is secured to the angular member $c$ of the fore-carriage and the other pin $o^4$ is secured to the slider $o^{4x}$ mounted upon the rod $o^{5x}$ carried by the frame of the apparatus, the said pin being adapted to engage with the groove $o^5$ of the cam $f^{5z}$. The pivots $o^6$ $o^7$ of the bell crank levers are mounted upon the lever $p$ pivoted to the under side of the support $p'$ carried by the frame of the apparatus. As will be seen from Fig. 15 the movements of the lever $p$ are controlled by the link $p^2$ the lower extremity of which engages with the face cam $m^{5x}$. The link $p^2$ works in the guide $p^{2x}$. The pivot pins $o^6$ $o^7$ pass through openings in the underside of the support $p'$ into engagement with corresponding holes $p^3$, $p^4$ formed in the bosses $o^x$, $o'^x$ of the respective bell crank levers. Only one of these pivot pins is in engagement at a time depending upon the position in the cam slot $m^{5xx}$ of the lower extremity of the link $p^2$. The arrangement is such that when the apparatus is started at A (Fig. 12) the pivot pin $o^6$ will be in engagement with the opening $p^3$ in the boss $o^x$ of the bell crank lever $o$. The deviation of the fore-carriage will thus be controlled by this lever $o$ under the influence of the cam $f^{5z}$.

The necessary deviations and reversals will be imparted to the apparatus as already described until the same reaches the point $A^3$; when this point is reached the pivot pin $o^6$ will be disengaged from the boss $o^x$ and the pivot pin $o^7$ will be engaged with the boss $o'^x$ of the bell crank $o'$. This result is obtained through the cam $m^{5x}$ being rotated by the toothed wheel $m$ to actuate the link $p^2$. The speed of rotation of the cam $m^{5x}$ may be readily varied by altering the gearing $p^5$ connecting the same to the driving wheel $m$ and the apparatus thus set for treating plots of land of any width. The supplemental train to be described later may also be employed. The action of the lever $o'$ on the fore-carriage $a^3$ will deviate the same in the opposite direction to that in which it was deviated by the lever $o$ as will be readily seen from the drawing; one cam thus serves to control all movements of the fore-carriage $a^3$ relatively to the frame of the apparatus. The locking of the fore-carriage $a^3$ may be effected in a similar manner to that described with reference to Figs. 1 to 10.

An arrangement in which a supplemental train is employed in conjunction with the cam $m^{5x}$ is shown in Figs. 16 and 17. In this arrangement the toothed wheel $m$ is mounted upon the same shaft $m^6$ as the face cam $m^7$ which is provided with the cam surface $m^8$. Adjacent to the shaft $m^6$ is arranged the support $m^9$ to which is pivoted the lever $m^{10}$. This lever is capable of moving freely in a horizontal plane and has one of its extremities $m^{11}$ forked and the other provided with a roller $m^{12}$ which is adapted to engage with the face of the cam $m^7$, being held up to the surface by the spring $m^{13}$. The forked end $m^{11}$ of the lever $m^{10}$ is adapted to engage and impart longitudinal movement to the claw clutch $m^{14}$ to engage the same with the corresponding part $m^{15}$ formed on the boss $m^{16}$ of the bevel wheel $m^{17}$ loosely mounted upon the shaft $m^{18}$. The clutch $m^{14}$ is splined to the shaft $m^{18}$ in such a manner as to rotate with said shaft but be capable of longitudinal movement therein; normally the clutch is held out of engagement with the part $m^{15}$ by the action of the spring $m^{13}$ and is only brought into engagement therewith when the roller $m^{12}$ at the extremity of the lever $m^{10}$ engages with the cam surface $m^8$. The bevel wheel $m^{17}$ is always in engagement with the bevel wheel $m^{19}$ which is carried by the shaft $f'$ supporting the worm $f^3$ actuating the slider. By this means the bevel wheel $m^{17}$ is continuously operated but owing to its loose mounting upon the shaft $m^{18}$ it cannot impart motion thereto until the claw clutch $m^{14}$ is brought into engagement therewith. The working of this arrangement will be readily understood as it will be seen that motion will be imparted to the face cam $m^7$ to actuate the claw clutch $m^{14}$ by the toothed wheel $m$ imparting motion to the shaft $m^6$ (Fig. 17). The reversal of the lateral deviation therefore results as the bevel gearing $m^{17}$, $m^{19}$ imparts motion to the cam $m^{5x}$ when the clutch is engaged. This arrangement permits of the reversal of the lateral deviation being readily varied and of the apparatus being adapted for use on tracts of land of considerable width.

Referring to Figs. 18 and 19, these illustrate a modified form of the apparatus as a whole, in which the slider $h^{4w}$ is adapted to move horizontally instead of vertically as in the previous arrangements. Motion is transmitted to the shaft $f'^w$ from the rear roller shaft $g^4$ through the sprocket wheel $e^x$. The worm $f^{3w}$ for actuating the slider is mounted on the shaft $f'^w$ together with the worm $e^{7w}$ for actuating the nut $e^{8w}$; this latter serves to reverse the motor and actuate the spindle $g^3$ in the hollow shaft $g^4$ of the roller $a^2$ (Fig. 2). The cam $f^{5w}$ is loosely mounted on the shaft $f'^x$ and is adapted to be secured to the same by the snug $r$ carried by the collars $r^2$ $r^3$ engaging therewith. The collars $r^2$ $r^3$ are free to slide along the shaft $f'^x$ but rotate therewith as they are splined to the said shaft. The gearing between the shafts $f'^w$ and $f'^x$ is such that the direction of rotation of the latter is independent of the direction of rotation caused by the power, owing to the said gearing comprising trains of two and three wheels respectively, the wheels $r^4$ $r^5$ being in mesh for one direction of rotation and the wheels $r^6$ $r^7$ $r^8$ in mesh for the other direction of rotation. The change of gearing is effected by the nut $e^{8w}$ acting on the sliding rod $e^{9w}$ to impart lateral movement to the gear wheels $r^4$ $r^6$. The reversal of the direction of deviation of the fore-carriage $a^3$ is effected by the bell crank levers $o$, $o'$ in a similar manner to the arrangement illustrated in Figs. 13 to 15 and therefore requires no further description. The toothed wheel $m$ controlling this movement is however not actuated by the slider $h^{4w}$ but by a projection or pawl $h^5$ on the cam $f^{5w}$ said pawl only actuating the toothed wheel when the cam moves in one direction. The locking of the fore-carriage is effected by a pin $d^x$ carried by the pivoted lever $d'^x$ engaging with a hole formed in the forked member $s$ transmitting motion from the cam $f^{5w}$ to the bell crank levers $o$, $o'$. The pin $d^x$ is disengaged from the member $s$ when the extremity of the lever $d'^x$ is depressed by contact with the collar $r^2$ said extremity being sloped or chamfered to facilitate the action. In this modification the deviation will occur at the mid point of the end to end traverse and not at the bounds of the lands under treatment as in the previous arrangements. The snug $r$ moves from side to side of the cam $f^{5w}$ and only locks said cam to the shaft $f'^x$ when in engagement with one of a series of corresponding slots formed equidistantly in the boss of the cam. When the plot of land under treatment has been traversed the pivot pin previously in engagement with the boss of its corresponding bell crank will be withdrawn and the other pivot pin engaged with its corresponding bell crank lever as previously described with reference to Fig. 15. This action will result in the apparatus being deviated in the opposite direction, causing the same to retraverse the land back to the initial starting point A, the reversals of the power supply taking place in the same manner irrespective of the direction of traverse of the apparatus.

When the apparatus is intended for use in connection with other agricultural operations the arrangement or attachment shown in Figs. 20 to 25 may be employed. The implements and devices required for these operations are arranged at each extremity of a rocking frame $a^x$ inclosing the ordinary frame $a$ of the apparatus. It will be seen that, in order to perform these operations for both directions of movement of the apparatus the devices mounted at each end of the rocking frame will have to be brought into operation. To attain this result the frame $a^x$ is adapted to be rocked about its pivot $t$ at each reversal, in the direction of motion of the apparatus so as to raise one set of implements out of operation and to lower the other set into operation.

The apparatus comprises in addition to the reversing and deviating mechanism previously described special bevel gearing $t'$ driven from the rear shaft $g^4$ of the roller, the said gearing actuating the forked slider $t^2$ (Fig. 20) through a worm $t^{2x}$ engaging therewith to impart horizontal movement to the bent rod $t^3$. The rod $t^3$ is guided in its movements by lugs $t^4$, $t^5$ (Fig. 23) carried by the frame $a$ of the apparatus. Adjacent to the pivot $t$ of the rocking frame $a^x$ depending plates $t^7$ (Figs. 22 and 24) are provided one being bolted at each side of the frame, said plates being so arranged that they may be detached and replaced in the inverted position when desired. These depending plates are formed with curved slots $t^8$ of the same width as the horizontal slots $u$ formed in corresponding depending plates $u'$ secured to the frame $a$ of the apparatus. These depending plates are arranged so that the slots $t^8$ and $u$ face each other, and a cross arm $t^{3x}$ on the bent rod $t^3$ is arranged as a sliding fit between these slots (Fig. 25). The cross arm $t^{3x}$ is furnished with a hinged sector $t^{4x}$ which on engagement with the pin $t^{5x}$ projecting into the slot $u$ exercises a wedging action which serves to lock the rocking frame $a^x$ to the frame $a$ of the apparatus. These pins $t^{5x}$ may be arranged at varying distances apart according to requirements. Owing to the formation of the slots $t^8$ and $u$ the outer frame will be rocked about its pivot $t$ when the cross arm $t^{3x}$ is moved horizontally and will be finally locked to the frame $a$ by the wedging action of the pivoted sector $t^{4x}$ incidental to its contact with one of the pins $t^{5x}$. The rocking frame is also provided with two sets of gearing $u^2$, $u^3$ engaging respectively with the gear wheels $u^4$, $u^5$ coupled with the source of power of the apparatus, the arrangement being such that the said wheels are thrown into and out of engagement according to the direction in which the apparatus is moving. The sets of gearing $u^2$ and $u^3$ are connected with the devices or implements arranged at the respective ends of the rocking frame $a^x$ and serve to actuate the same. A direct drive may also be provided by means of the central power shaft $t^x$ (Fig. 24) which runs through the hollow pivots $t$ of the rocking frame $a^x$. Suitable brackets $s^x$ may be provided for guiding the rocking frame in its movements or for fixing the said frame in any desired position by means of a suitable cramp.

The cams for deviating the fore-carriage may be such that all lines drawn through their centers of rotation are approximately of equal length. A cam arranged in this manner, is capable of imparting the necessary deviation to the fore-carriage and returning the same to its position of alinement. The formation of the cam may however be modified as desired.

A tray may be placed under the whole of the gear and motor to catch the oil, and scrapers $s'$ (Fig. 1) for the rollers may be attached to the frame of the machine.

Two detachable sighting bars B, B' (Fig. 1) may be provided for setting the apparatus with respect to the plot of ground to be treated. The apparatus is generally arranged to be driven at a speed of a foot and a half per second, but this may be varied. A clutch may be provided between the source of power and the machine and may be operated in conjunction with the reverse. The driving mechanism may be modified by providing a differential gearing which is driven by a shaft carried between the two back rollers or drums. A direct drive may be taken to the back rollers or drums without the intervention of the differential gear above described. The drums or rollers may be modified in size and shape to suit the surface of the ground to be treated, and intervals of any desired width may be left between said drums. Any number of drums may be mounted on the two main shafts and the surfaces of the drums may be corrugated or fluted or provided with flanges or ribs as may be desirable when agricultural operations other than rolling operations are being effected.

What I claim and desire to secure by Letters Patent of the United States is:—

1. In a machine for performing rolling, mowing, and similar agricultural operations the combination with a source of power of means for causing the machine to automatically traverse a lawn or plot of land of any area in a zig-zag path.

2. In a machine for performing rolling, mowing and similar agricultural operations the combination of a source of power and means for causing the machine to automatically traverse a lawn or plot of land of any area in a zig-zag path in more than one direction.

3. In a machine for automatically performing agricultural operations, the combination of a source of power means for transmitting said power to impart motion to the machine, and means for causing the said machine to deviate so as to traverse a zig-zag path.

4. In a machine for automatically performing agricultural operations, the combination of a source of power means for transmitting said power to impart motion to the machine, means for causing the said machine to deviate so as to traverse a zig-zag path, and means for effecting the reversal of the direction of movement.

5. In a machine for automatically performing agricultural operations, the combination of a source of power, means for transmitting said power to impart motion to the machine, means for causing the said machine to deviate so as to traverse a zig-zag path, means for effecting the reversal of the direction of movement when said deviation takes place, and means for causing the direction of said deviation to be reversed for causing the machine to retraverse the ground.

6. In a machine for performing rolling, mowing and similar agricultural operations, the combination with a source of power, of means for causing the machine to automatically traverse a lawn or plot of land of any area in a zig-zag path and an attachment which can be brought into or out of engagement with the ground and source of power according to the direction in which the machine is moving.

7. In a machine for performing rolling, mowing and similar agricultural operations, the combination of a source of power, means for causing the machine to automatically traverse a lawn or plot of land of any area in a zig-zag path, an attachment which can be brought into or out of engagement with the ground and source of power according to the direction in which the machine is moving, and means for locking the aforesaid attachment in its various positions.

In testimony whereof I affix my signature in presence of two witnesses.

GEORGE HERBERT COLT.

Witnesses:
WALTER J. SKERTEN,
T. SELBY WARDLE.